United States Patent [19]

Ziaylek, Jr.

[11] 4,192,990
[45] Mar. 11, 1980

[54] TIP ASSEMBLY FOR USE WITH A THERMAL PRESS

[75] Inventor: Theodore Ziaylek, Jr., Yardley, Pa.

[73] Assignee: Yardley Products, Inc., Yardley, Pa.

[21] Appl. No.: 814,361

[22] Filed: Jul. 11, 1977

[51] Int. Cl.² .................. H05B 3/02; B30B 15/34
[52] U.S. Cl. ........................ 219/243; 156/303.1; 156/583.1; 165/185; 219/229; 219/239; 219/531; 219/533; 228/55
[58] Field of Search ............... 219/221, 227, 229–241, 219/243, 531, 533, 530, 540; 156/303.1, 298, 583; 165/185; 228/51, 54, 55

[56] References Cited

U.S. PATENT DOCUMENTS

| 1,988,827 | 1/1935 | Bennett | 219/236 |
|---|---|---|---|
| 2,139,554 | 12/1938 | Martin | 219/238 X |
| 2,477,040 | 7/1949 | Brown et al. | 219/221 X |
| 2,569,250 | 9/1951 | Mims | 219/238 X |
| 2,951,927 | 9/1960 | Weller | 219/227 |

FOREIGN PATENT DOCUMENTS

| 138853 | 12/1947 | Austria | 219/227 |
|---|---|---|---|
| 2303288 | 8/1973 | Fed. Rep. of Germany | 156/303.1 |

OTHER PUBLICATIONS

Ungar—New Soldering Tools Catalog, Ungar Electric Tools, Inc., Los Angeles 66, Calif.

*Primary Examiner*—A. Bartis
*Attorney, Agent, or Firm*—John J. Kane; Frederick A. Zoda; Albert Sperry

[57] ABSTRACT

An electrically heated tip assembly, particularly useful with a cyclically operated thermal press usable for forcible placement of inserts of hard material within bases of softer materials, includes a generally longitudinal tubular core member formed of a thermally conductive material. The core encloses an electric resistance heating element and has a tip element secured to one end thereof in heat exchange relationship with the heating element. The tip element includes a protruding finger member engageable with an insert and a paraboloidal section between the core member and protruding finger member to facilitate the concentration of heat downwardly into the finger member during the insertion portion of the operating cycle of the press. A heat dissipation member, including a plurality of spaced, outwardly extending, annular disks forming a generally upwardly extending envelope of overall paraboloidal configuration, is adjustably positioned about the core to facilitate the dissipation of heat from the tip element and core member inbetween cycles of operation of the press.

8 Claims, 4 Drawing Figures

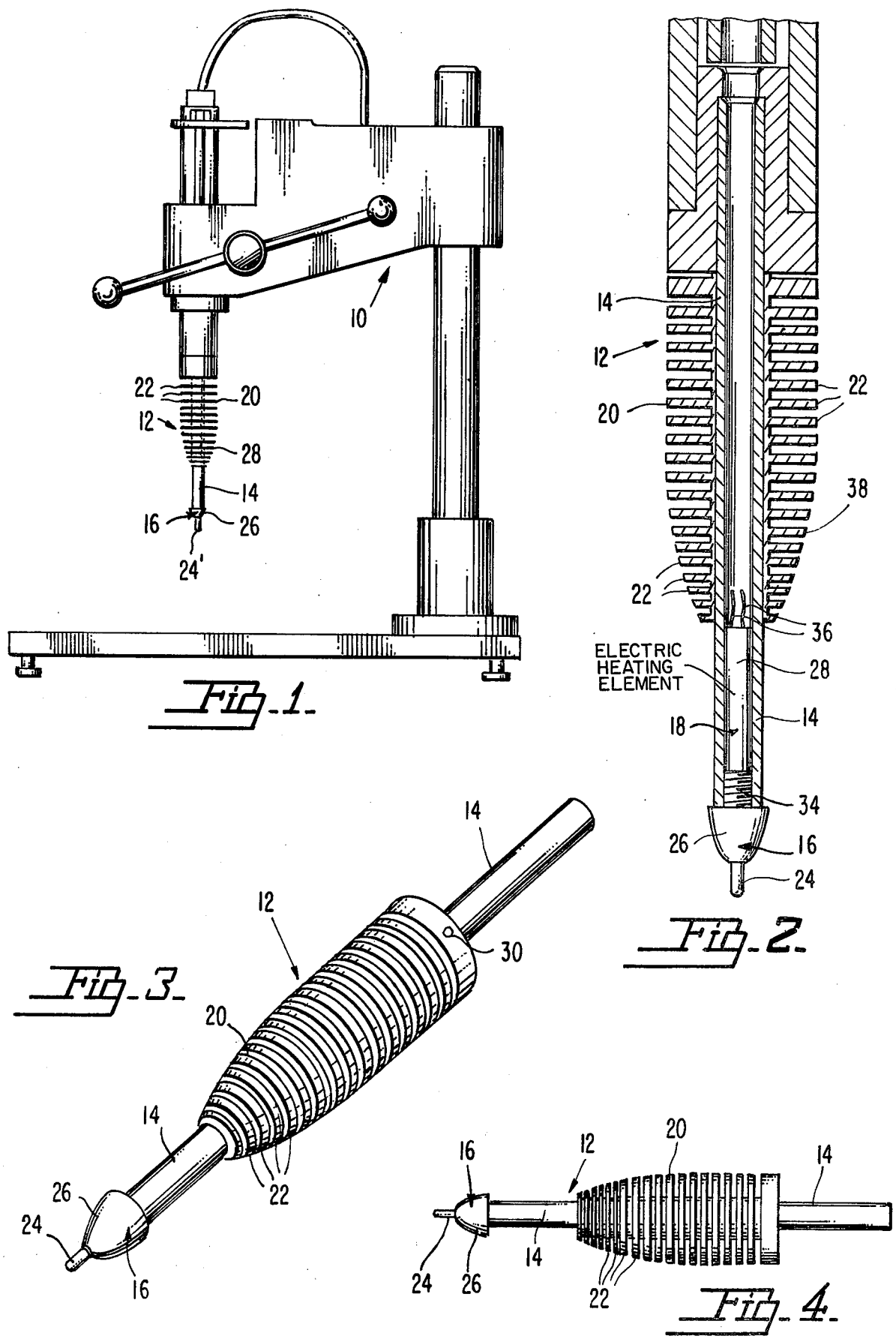

4,192,990

TIP ASSEMBLY FOR USE WITH A THERMAL PRESS

BACKGROUND OF THE INVENTION

1. Field of the Invention

Metallic inserts are often imbedded in any variety of plastic materials in order to afford a means for receiving mating fastener elements. For this purpose cylindrical inserts are often provided with threaded bores such that when the insert is imbedded in a recess formed in the surface of a plastic work piece it will provide a hole or recess therein having metallic internal threads which are adapted to receive mated threads from a complementary male fastener element.

In order to insert such metallic inserts into the various soft materials it is desirable to utilize a thermal press which will heat the metallic insert in order to aid in the imbedding and the gripping of the insert into the soft base material. The base material may be a plastic material or other material softer than the metal of the insert which may include wood, aluminum or any other relatively soft material.

As such the present invention is within the field of those presses which are useful to achieve the two-fold purpose of, firstly, heating a metallic insert prior to insertion and, secondly, performing the act of insertion of a metallic fastener into the surface of soft base material.

2. Description of the Prior Art

The use of thermal presses is well known for the placement of metallic inserts into soft base materials. However, to achieve this desired end the thermal presses utilized heretofore were only particularly useful for individual hand operated insertions. In order to utilize such a thermal press for repeated insertions such as is required in normal assembly jobs, a means must be utilized to closely control the heat in the tip element of the head of the thermal press. There are two main problems which work against one another and no thermal press utilized heretofore has solved each of these problems. The first problem is the accumulation of excessive heat in the tip element which may distort or overly heat the soft base material and as such not achieve a firm inter-connection between the insert and the base material. The second problem working in opposition to the first problem is the lack of generation of sufficient heat in the tip element and the consequential lack of generation of sufficient heat in the insert itself in order to sufficiently displace the base material during the process of insertion.

These problems work in opposition to one another specifically during cyclical operation of the thermal press which is required in assembly line operations. The usual problem is the accumulation of excessive amounts of heat in the tip element and, as such, the inventive concept of utilizing a paraboloidal configuration of heat dissipation fins is a primary aspect of novelty of the present invention.

SUMMARY OF THE INVENTION

An embodiment of the tip assembly of the present invention which is useful with a thermal press includes a core member which extends in a general longitudinal direction and may preferably be in the form of a hollow tubular structure of thermally conductive material. This core member may provide in one end thereof a means for securing thereto a tip element to facilitate the heating of the tip element by the thermal press.

A heating means is adapted to be held by the core member to provide a source of heat to flow to the tip element for heating of an insert prior to insertion within a soft base material. To achieve this purpose the heating means should be positioned thermally adjacent to the tip element in order to facilitate the selective heating thereof.

In order to aid in the prevention of the accumulation of excessive amounts of heat in the tip element a heat dissipation means should be positioned about the core member in an area thermally adjacent to the heating means and the tip element in order to facilitate the passage of heat away therefrom. In order to utilize convection as the means for the dissipation of heat the heat dissipation means should be formed as a plurality of outwardly extending disks or fins of generally annular configuration which form an upwardly extending paraboloidal configuration of the plurality of fins. In this manner heat dissipation from the entire heated portion of the tip assembly is facilitated.

In order to aid in the concentration of heat directly into the tip element a portion of the tip element may be configured of a conductive material, a portion of which has a paraboloidal configuration.

The tip element may include an outwardly extending finger from the paraboloidal section such that an insert can be positioned therearound prior to the insertion cycle of the inserting process. In this manner when utilized with assembly line cyclical operations the accumulation of heat in the tip element and in the insert for insertion into the soft base material is facilitated and after the insertion the dissipation of heat from the tip assembly by convection to the outer external environment is also aided by the heat dissipation means.

The heating means is most preferably an electrical resistance heating element which is connected by electrical lines upward through the thermal press to a source of electrical power. This electrical resistance heating element is preferably locatable within a tubular core member to be held in abutment adjacent the tip element which is held within one of the hollow ends of the tubular core member.

To aid in varying the characteristics of heat dissipation of the tip assembly of the present invention the heat dissipation means may be movable longitudinally along the tubular core member to vary the relative orientation between the heat dissipation means and the core member, the heating means and the tip element.

To facilitate inter-connection between the tip element and the core member one end of the hollow tubular core member can be female threaded to accept a male threaded portion of the tip element and thereby secure firm binding and thermal flow therebetween.

The paraboloidal heat dissipation means is preferably formed with a plurality of annular disks fitted about the tubular hollow core member. These disks are preferably of a gradually increasing radius in an upward direction to thereby form the overall paraboloidal external envelope or configuration.

It is an object of the present invention to provide a tip assembly for use with a thermal press when operated in a cyclical fashion as required in assembly line processing.

It is an object of the present invention to provide a tip assembly for a thermal press which prevents the accumulation of excessive amounts of heat in the tip assembly itself and in the inserts to be inserted.

It is an object of the present invention to provide a thermal press tip assembly which includes a paraboloidal heat dissipation means to most efficiently dissipate accumulations of heat by convection to the surrounding air environment.

It is an object of the present invention to provide a thermal press tip assembly which facilitates the concentration of heat in the tip element during the inserting portion of the process cycle.

It is an object of the present invention to provide a thermal press tip assembly which facilitates the dissipation of excessive amounts of heat during the non-inserting portion of the cyclical process.

It is an object of the present invention to provide a thermal press tip assembly which facilitates thermal flow from the heating means to the tip element thereof.

It is an object of the present invention to provide a thermal press tip assembly including a paraboloidal heat concentrating means of thermally conductive material and a paraboloidal heat dissipating means of thermally conductive material.

BRIEF DESCRIPTION OF THE DRAWINGS

While the invention is particularly pointed out and distinctly claimed in the concluding portions therein, a preferred embodiment is set forth in the following detailed description which may be best understood when read in connection with the accompanying drawings, in which:

FIG. 1 is a side plan view of a thermal press utilizing a preferred embodiment of a tip assembly of the present invention;

FIG. 2 is a cross-sectional view of an embodiment of the tip assembly of the present invention;

FIG. 3 is a perspective view of an embodiment of a tip assembly of the present invention; and FIG. 4 is a side plan view of an embodiment of a tip assembly of the present invention.

DETAILED DESCRIPTION OF THE PREFERRED EMBODIMENT

An embodiment of a tip assembly 12 of the present invention for use with a thermal press 10 includes a longitudinally extending core member 14 which is preferably formed of a thermally conductive material. The core member is adapted to receive in one end thereof a tip element. The tip element 16 is adapted to receive therearound an insert for insertion into a soft base material such as plastic or the like.

A heating means 18 is configured to be positoned and held by the core member 14 in a location which is thermally adjacent to the tip element 16. In this manner the heating of tip element 16 by the heating means 18 is facilitated to further heat an insert in order to aid placement within the base material.

Subsequent to insertion the heat which has been accumulated within the tip element 16 of the tip assembly 12 must be dissipated and in order to achieve this purpose a heat dissipation means 20 should be positioned about the core member 14. The heat dissipation means 20 is preferably configured including a plurality of heat dissipation fins or heat dissipation disks 22 which are preferably of annular configuration extending outward from the core member 14. The disks 22 closest to the tip element 16 are preferably of a narrow diameter and each disk which is further away from the tip element 16 should be of a larger diameter such that the external circumferences of the successive disks form an overall general paraboloidal envelope 38 extending and opening in an upward direction. This overall paraboloidal configuration has been found to be the maximal structure to facilitate the dissipation of heat from the tip element 16. A parabaloid is that three dimensional geometric figure formed by the rotation of a parabola about its Y-axis. This paraboloidal envelope of heat dissipation disks 22 allows the large amount of heat dissipation due to convection with the surrounding air.

Similarly the use of the paraboloidal configuration is preferable to form a paraboloidal section 26 of the tip element 16 to facilitate the concentration of heat in the protruding finger 24 of the element 16. As shown in FIG. 2 the paraboloidal section 26 of the tip element facilitates the transfer of heat from heating means 18 downward to finger member 24 immediately prior to the insertion step of a cyclical or repetitive insertion process. The flow of heat from heating means 18 is concentrated directly into the finger member 24 to thereby secure effective heating of the insert to the desired operating pressure immediately prior to and during insertion into the soft base material.

The cyclical process utilized in assembly line operations of the thermal press 10 using the tip assembly 12 of the present invention includes an insertion step. This step includes the initial placement of an insert onto the finger member 24 of the tip assembly 12. The press 10 then moves downwardly while the heating means 18 heats the tip element 16 to thereby transfer heat to the insert and thereby raise the temperature of the insert to the desired level. The press then will exert the downward pressure to force the insert into the material. Of course, the inserting is facilitated by the raising of the insert to the desired operating temperature by the system of the present invention. Subsequent to the direct insertion the heating means 18 will be shut off to thereby allow the paraboloidal heat dissipation means 20 to dissipate the heat which has been generated within the tip element 16. The press 10 will move upwardly to a position ready to accept another insert thereon. If the heat dissipation means 20 is not fully efficient the temperature of the finger member 24 will be above the desired temperature and as such when the heating means 18 is again turned on prior to insertion the temperature of the tip element 24 will be raised above the desired temperature. Excess temperatures during insertion will prevent firm interlocking between the soft base material and the insert due to the melting of the soft base material. Therefore the accumulation of excessive heat within the tip element 24 is obviously an undesirable characteristic. As such the advantages of using a fully efficient paraboloidal heat dissipation means 20 is shown.

The heating means 18 of the present invention will usually comprise an electrical resistance heating means 28 which is connected by lead lines 36 through the press to a source of electrical power. These lead lines may pass through a switch or other intermittently operated electrical contact means to synchronize the flow of electricity through lead lines 36 with the cyclical operation of the thermal press 10 within the assembly line system.

To facilitate the action of the paraboloidal heat dissipation means 20, a set screw 30 as shown in FIG. 3 may be included therein to be the means of securing the heat dissipation means 20 to the hollow tubular core member 14. In this manner by loosening of the set screw 30 the heat dissipation means 20 can be slightly varied in vertical position to vary the relative position between the dissipation means 20 and the heating means 18, the core member 14 or the tip element 16. If it is found that the heat dissipation means 20 is performing too efficiently such that excessive cooling of the tip element 16 even prior to insertion is occurring, then the heat dissipation means 20 can be moved upwardly to a position further removed from the tip element 16 to thereby lower the efficiency of the cooling operation. The tip element 16 may be configured to include a threaded portion 34 which is adapted to mate with female threads positioned within one end of the hollow core member 14 to provide a means for securing inter-connection between the tip element 16 and the core member 14. In this manner the tip element 16 can be removed and replaced with a new tip element whenever excessive wear from repeated cyclical operation shows the desire for replacement of tip element 16.

It should be appreciated that the usefulness of paraboloidal section 26 to concentrate the heat into protruding finger member 24 of tip element 16 is complementary with the efficiency of the paraboloidal configuration of heat dissipation means 20 to thereby provide an overall structure which is useful for the very accurate control of the temperature of the tip element 16 of the tip assembly 12 of the thermal press 10 to very closely control and prevent over or underheating of the inserts prior to and during the actual step of insertion into the soft base material. It is this accurate control achieved by the paraboloidal means of concentrating the heat and especially the paraboloidal means of dissipating the heat which is one of the most novel and important characteristics of the present invention.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A tip assembly for use with a thermal press comprising:
   (a) a longitudinally extending core member formed of thermally conductive material and being of an approximately constant lateral diameter longitudinally therealong;
   (b) a tip element adapted to be securely held at one end of said core member to be heated by a heating means associated with said core member, said tip element including a protruding finger member of a lateral diameter less than the lateral diameter of said core member, the remaining portion of said tip element entirely comprising a paraboloidal section adjacent to said finger member to facilitate the concentration of heat flow from the heating means to said finger member, said paraboloidal section having a gradually increasing diameter from the location adjacent said protruding finger member to the location of termination thereof adjacent said core member, the diameter of said paraboloidal section adjacent said protruding finger member starting at a diameter approximately equal to the diameter of said protruding finger member and gradually increasing parabolically to the point of termination thereof adjacent said core member where the diameter of said paraboloidal section is greater than the diameter of said core member:
   (c) a heating means held by said core member and positioned thermally adjacent said tip element to selectively cause heating thereof; and heat dissipation means positioned around said core member to facilitate dissipation of heat from said tip element and said core member, said heat dissipation means including a plurality of spaced outwardly extending, disks forming an upwardly extending envelope of generally paraboloidal overall outer configuration to facilitate dissipation of heat from said tip assembly.

2. The assembly as defined in claim 1 wherein said heating means comprises an electrical resistance heating element.

3. The assembly as defined in claim 1 wherein said core member is of a tubular configuration to facilitate holding of said heating element therein and securing said tip element to one end thereof.

4. The assembly as defined in claim 1 wherein said heat dissipation means is movable along said core member to vary the relative orientation between said heat dissipation means and said core member, said heating means and said tip element.

5. The assembly as defined in claim 1 wherein one end of said core member is female threaded and said tip element is male threaded to provide a mated means of securely holding said tip element to said core member.

6. The assembly as defined in claim 1 wherein said disks are annular and of gradually increasing radius in an upward direction to form an overall paraboloidal external envelope configuration.

7. The assembly as defined in claim 1 wherein said core member holds said heating means and said tip element in abutment to assure full thermal flow therebetween.

8. A tip assembly for use with a thermal press comprising:
   (a) a longitudinally extending hollow tubular core member formed of thermally conductive material and being of an approximately constant lateral diameter longitudinally therealong;
   (b) a tip element adapted to be securely held within one end of said core member to be heated by the a heating means associated with said core member, said tip element including an outwardly extending finger member being of a lateral diameter less than the lateral diameter of said core member, the remaining portion of said tip element entirely comprising a paraboloidal section adjacent to said finger member to facilitate the concentration of heat flow to said finger member from the heating means, said paraboloidal section having a gradually increasing diameter from the location adjacent said protruding finger member to the location of termination thereof adjacent said core member, the diameter of said paraboloidal section adjacent said protruding finger member starting at a diameter approximately equal to the diameter of said protruding finger member and gradually increasing parabolically to the point of termination thereof adjacent said core member where the diameter of said paraboloidal section is greater than the diameter of said core member;

(c) an electrical resistance heating means held by said core member and positoned thermally adjacent said tip element to selectively cause heating thereof; and
(d) heat dissipation means positioned around said core member to facilitate dissipation of heat from said tip element and said core member, said heat dissipation means including a plurality of spaced outwardly extending, annular disks forming an upwardly extending envelope of genrally paraboloidal overall outer configuration to facilitate dissipation of heat from said tip assembly.

* * * * *